(12) United States Patent
Tomimatsu et al.

(10) Patent No.: US 8,245,675 B2
(45) Date of Patent: Aug. 21, 2012

(54) VARIABLE VALVE APPARATUS

(75) Inventors: Makoto Tomimatsu, Susono (JP);
Mamoru Yoshioka, Susono (JP)

(73) Assignee: Toyota Jidosha Kabushiki Kaisha,
Toyota-shi (JP)

( * ) Notice: Subject to any disclaimer, the term of this patent is extended or adjusted under 35 U.S.C. 154(b) by 410 days.

(21) Appl. No.: 12/695,427

(22) Filed: Jan. 28, 2010

(65) Prior Publication Data

US 2010/0192883 A1 Aug. 5, 2010

(30) Foreign Application Priority Data

Feb. 4, 2009 (JP) ................................. 2009-023944

(51) Int. Cl.
*F01L 1/34* (2006.01)
*F01L 1/00* (2006.01)
(52) U.S. Cl. .................................. 123/90.15; 123/90.19
(58) Field of Classification Search .... 123/90.15–90.17, 123/90.19
See application file for complete search history.

(56) References Cited

U.S. PATENT DOCUMENTS

| 6,109,225 | A * | 8/2000 | Ogita et al. | 123/90.15 |
| 6,138,621 | A * | 10/2000 | Albanello et al. | 123/90.12 |
| 6,283,074 | B1 * | 9/2001 | Takahashi et al. | 123/90.15 |
| 6,330,869 | B1 * | 12/2001 | Yoshiki et al. | 123/90.15 |
| 6,637,386 | B2 * | 10/2003 | Murata et al. | 123/90.15 |
| 6,640,758 | B2 * | 11/2003 | Ashida | 123/90.15 |
| 2002/0062799 | A1 * | 5/2002 | Murata et al. | 123/90.15 |
| 2008/0257289 | A1 * | 10/2008 | Nakamura | 123/90.16 |
| 2010/0305834 | A1 * | 12/2010 | Ito et al. | 701/105 |
| 2012/0048220 | A1 * | 3/2012 | Hayashi | 123/90.15 |
| 2012/0073531 | A1 * | 3/2012 | Urushihata | 123/90.15 |
| 2012/0085303 | A1 * | 4/2012 | Kobayashi et al. | 123/90.15 |

FOREIGN PATENT DOCUMENTS

| JP | 5-156972 | 6/1993 |
| JP | 2003-328789 | 11/2003 |
| JP | 2004-169646 | 6/2004 |
| JP | 2005-248759 | 9/2005 |
| JP | 2007-32415 | 2/2007 |

* cited by examiner

*Primary Examiner* — Thomas Moulis
(74) *Attorney, Agent, or Firm* — Oblon, Spivak, McClelland, Maier & Neustadt, L.L.P.

(57) ABSTRACT

A first overlap amount that is an overlap amount of overlap between an intake valve opening timing and an exhaust valve opening timing, is calculated based on rotation speed of an internal combustion engine, load on the engine, and temperature of a working fluid. A second overlap amount that is the overlap amount that is set so that the relative rotation phase of at least one of the intake-side camshaft and the exhaust-side camshaft relative to the rotation phase of the crankshaft is fixed when the engine stops, is calculated based on the temperature of the working fluid. The overlap amount is set to equal to the second overlap amount, if the first overlap amount is larger than the second overlap amount. The overlap amount is set to equal to the first overlap amount, if the first overlap amount is less than or equal to the second overlap amount.

13 Claims, 12 Drawing Sheets

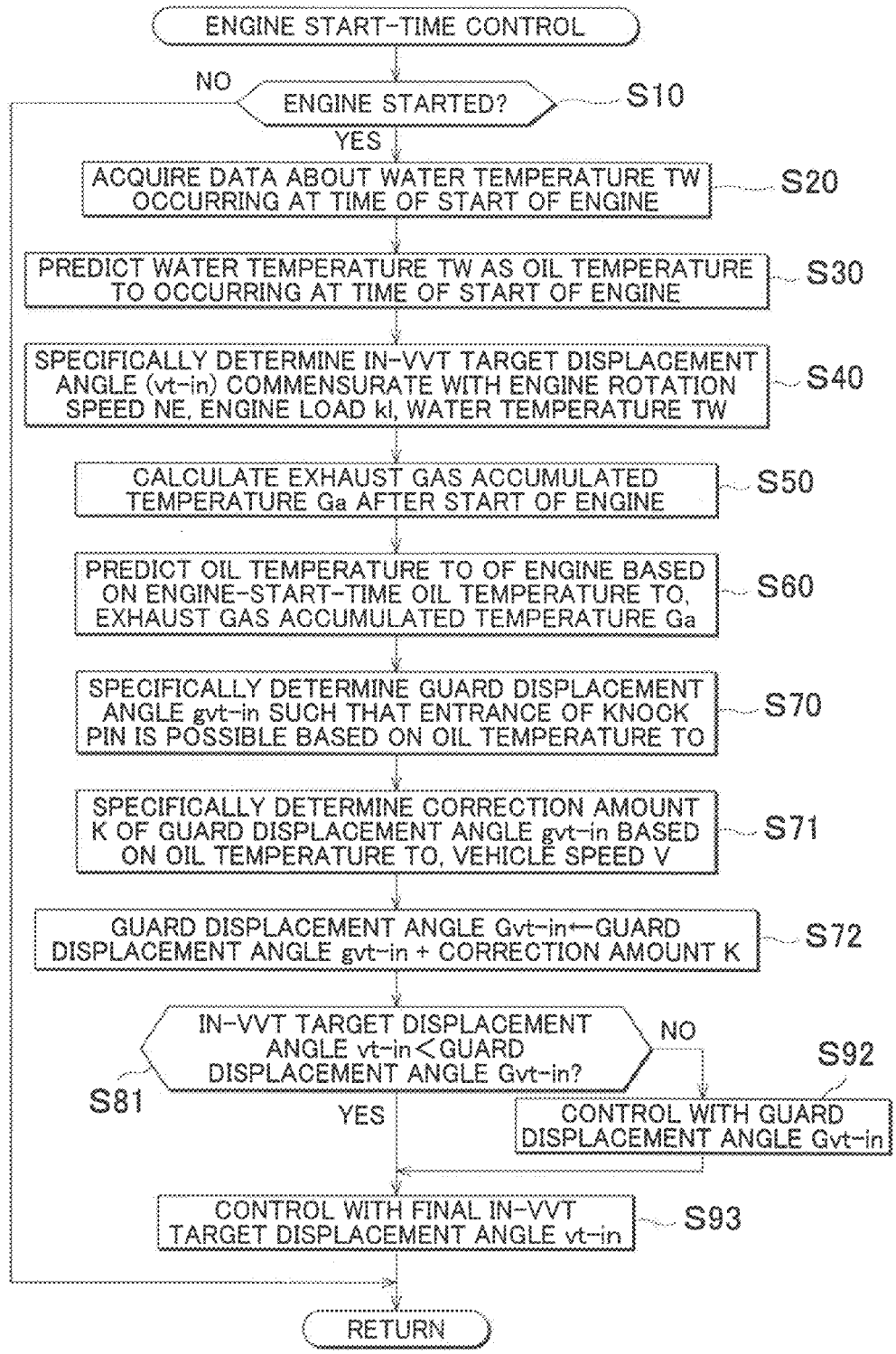

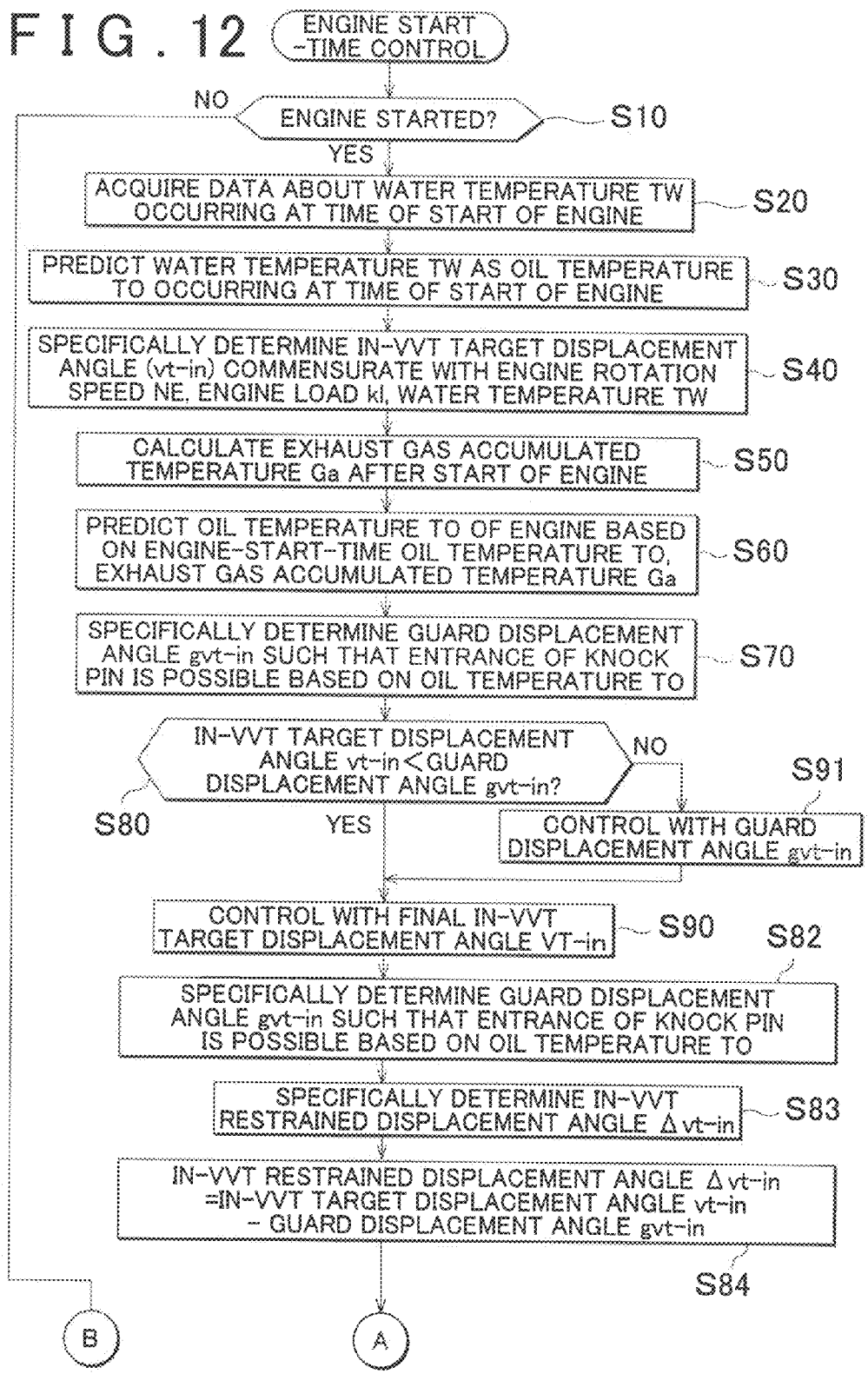

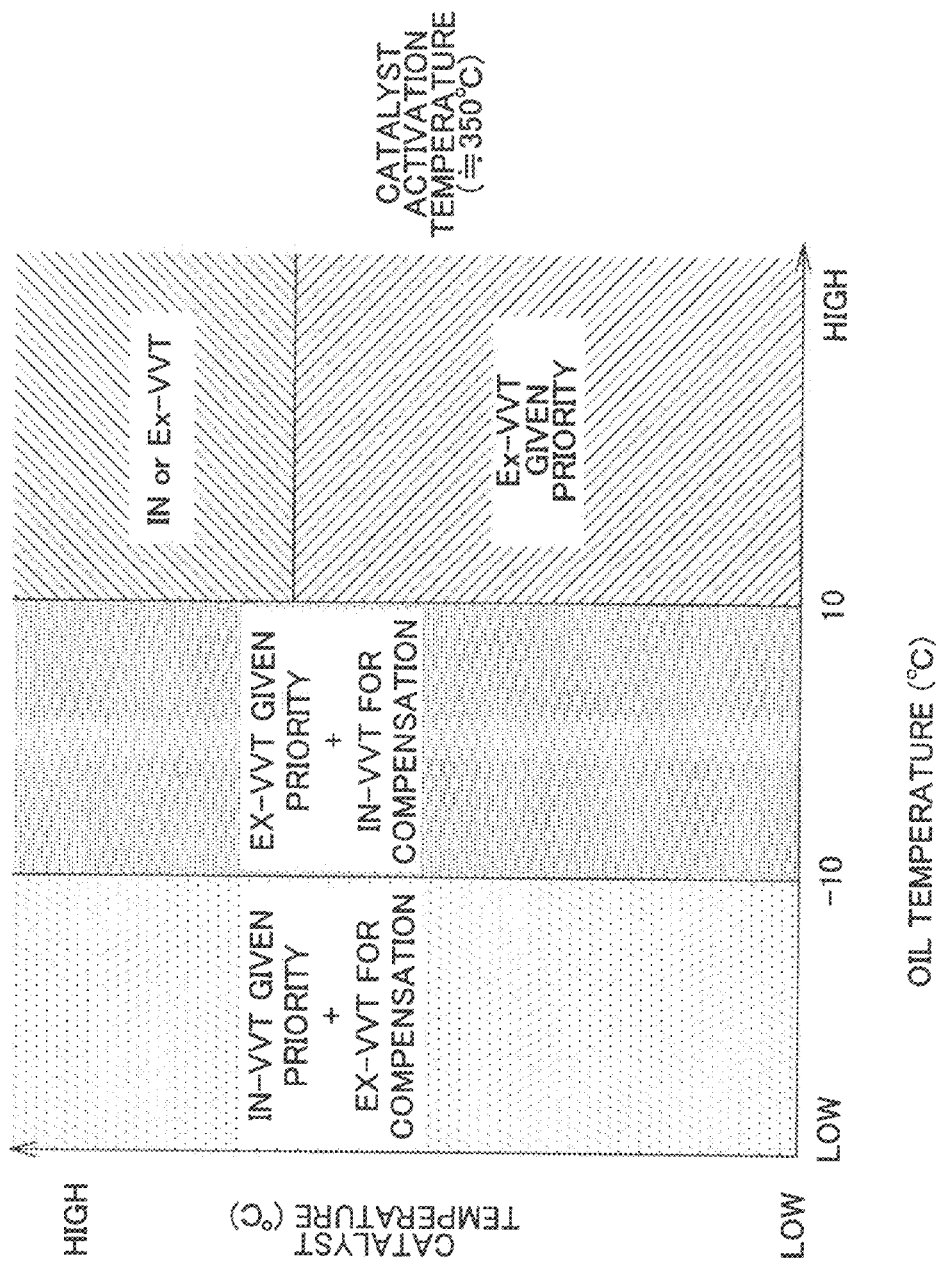

VARIABLE VALVE APPARATUS

INCORPORATION BY REFERENCE

The disclosure of Japanese Patent Application No. 2009-023944 filed on Feb. 4, 2009 including the specification, drawings and abstract is incorporated herein by reference in its entirety.

BACKGROUND OF THE INVENTION

1. Field of the Invention

The invention relates to a variable valve apparatus for controlling a variable valve apparatus such as a VVT (variable valve timing system), or the like.

2. Description of the Related Art

As for the foregoing type of variable valve apparatus, Japanese Patent Application Publication No. 5-156972 (JP-A-5-156972) discloses a mechanism that is capable of continuously changing the phase of rotation, that is, the displacement angle, of each of an intake-side camshaft and an exhaust-side camshaft via a working fluid, such as oil or the like, relative to the rotation phase of a crankshaft. More concretely, the variable valve apparatus as described above, for example, has a rotor which has vanes that are provided along an outer peripheral portion of the rotor, and which is fixed to an intake-side camshaft, and a housing which houses the rotor, and to which rotation force is transmitted from the crankshaft. In this apparatus, the vanes are fixed to the housing or moved relative to the housing in the rotation direction, according to the hydraulic pressure of a working fluid, such as oil or the like, that is supplied into the housing. When the internal combustion engine is stopped, a lock pin fits into a lock hole that is formed in one of the vanes, which are fixed at a predetermined position, so that the rotation phase of the intake-side camshaft and the rotation phase of the crankshaft are fixed to each other. In conjunction with the variable valve apparatus having a mechanism as described above, a technology capable of reducing the decrease in the effective compression ratio while reducing the pumping loss at low temperature, by advancing the opening/closing timing of the intake valves.

Besides, Japanese Patent Application Publication No. 2003-328789 (JP-A-2003-328789), Japanese Patent Application Publication No. 2007-32415 (JP-A-2007-32415) and Japanese Patent Application Publication No. 2004-169646 (JP-A-2004-169646) disclose a technology in which if cooling water that cools the internal combustion engine has high temperature, the combustion of fuel in the combustion chambers is stabilized by setting the displacement angle of the exhaust valves to the most retarded angle or changing the amount of the overlap between the open period of the intake valves and the open period of the exhaust valves.

However, according to the variable valve apparatus that has a mechanism capable of continuously changing the rotation phase of the intake-side camshaft and the rotation phase of the exhaust-side camshaft via a working fluid such as oil or the like, for example, when the temperature of the oil is low, it becomes difficult to fix the rotation phases of the crankshaft and the intake-side camshaft at the time of stop of the internal combustion engine, since the viscosity of oil increases as the temperature of oil becomes lower. More concretely, for example, in the case where the viscosity of oil as a working fluid is increased, there occurs a relative decline in the speed at which the vanes of the rotor move within the oil in the rotation direction of the intake-side camshaft according to friction when the engine is stopped. If the internal combustion engine stops operating while the vanes are moving at such a reduced speed, the vanes cannot quickly move to the position where the vanes are designed to be fixed when the engine is stopped, and therefore it becomes difficult to accurately fit the lock pin into the lock hole formed in a vane.

In addition, a technology capable of achieving both improved combustion characteristic of an internal combustion engine and reduced production of hydrocarbon (HC) gas by setting the amount of overlap between the open period during which the intake valves are open and the open period during which the exhaust valves are open to an appropriate value is also desired.

SUMMARY OF THE INVENTION

The invention provides a variable valve apparatus that is able to certainly achieve the fitting of a lock pin into a lock hole even in a low-temperature condition, and attain both improved combustion characteristic of an internal combustion engine, and reduced production of hydrocarbon (HC) gas.

One aspect of the invention of the invention relates to a variable valve apparatus that includes: rotation phase variable control means for including a vane and changing relative rotation phase of at least one of an intake-side camshaft and an exhaust-side camshaft that rotate to open and close an intake valve and an exhaust valve, respectively, of an internal combustion engine, relative to rotation phase of a crankshaft, according to hydraulic pressure of a working fluid; lock means that includes a lock pin that is switchable between being fitted and not being fitted to a lock hole formed in the vane so that the lock pin assumes a lock state of fixing the relative rotation phase by mechanically fixing at least a portion of the rotation phase variable control means when the internal combustion engine stops, and discontinues the lock state when the internal combustion engine starts; and a control device. The control device includes: first specific determination means for setting a first overlap amount that is requested as an overlap amount of overlap between an intake valve opening timing during which the intake valve is open, and an exhaust valve opening timing during which the exhaust valve is open, based on rotation speed of the internal combustion engine, load on the internal combustion engine, and temperature of the working fluid; second specific determination means for setting a second overlap amount that is the overlap amount that is set so that the relative rotation phase is fixed when the internal combustion engine stops, based on the temperature of the working fluid; and control means for controlling the rotation phase variable control means so that the overlap amount becomes equal to the second overlap amount, if the first overlap amount is larger than the second overlap amount, and for controlling the rotation phase variable control means so that the overlap amount becomes equal to the first overlap amount, if the first overlap amount is less than or equal to the second overlap amount.

According to the foregoing construction, the first specific determination means specifically determines the first overlap amount that is to be a target of the amount of the overlap between the intake valve opening timing during which the intake valve is open, and the exhaust valve opening timing during which the exhaust valve is open, on the basis of the rotation speed of the internal combustion engine, the load that acts on the internal combustion engine, and the temperature of the working fluid. The rotation speed of the internal combustion engine, the load that acts on the internal combustion engine, and the temperature of the working fluid may each be measured data obtained through measurement via various sensors, or may also be predicted data. A purpose in referring to the rotation speed of internal combustion engine and the load that acts on the internal combustion engine in specifically determining the first overlap amount is to realize reduction of production of HC gas during operation of the engine and restraint of the decline in the combustion efficiency that is caused by residual gas that remains in the internal combustion engine. A reason for referring to the temperature of the working fluid in addition to the rotation speed of the internal combustion engine and the load that acts on the internal combustion engine is that, depending on the temperature of the working fluid, that is, depending on the temperature of the internal combustion engine that corresponds to the temperature of the working fluid, the amount of residual gas that remains in the internal combustion engine changes, and the overlap amount for realizing an optimum combustion state changes.

It is to be noted herein that even in the case where the first overlap amount that is to be a target is specifically determined, a situation can occur in which due to the viscosity of the working fluid that changes according to the temperature of the working fluid, the speed of the vane in the working fluid changes so that the vane cannot return to a position at which the lock pin can fit into the lock hole when the internal combustion engine stops.

Therefore, the second specific determination means specifically determines the second overlap amount on the basis of the temperature of the working fluid so that the relative rotation phase can be fixed when the engine stops. The expression "so that the relative rotation phase can be fixed when the internal combustion engine stops" means that the vane can move to a position at which the lock pin can fit into the lock hole when the internal combustion engine stops. That is, the second specific determination means specifically determines the second overlap amount that corresponds to the position of the vane at which the lock pin can fit into the lock hole when the internal combustion engine stops.

The control means controls the rotation phase variable control means so that the overlap amount is set to the second overlap amount, if the first overlap amount is larger than the second overlap amount. If the first overlap amount is less than or equal to the second overlap amount, the control means controls the rotation phase variable control means so that the overlap amount is set to the first overlap amount. In other words, the control means controls the rotation phase variable control means so as to make it possible to reduce the production of HC gas during operation of the internal combustion engine, improve the combustion efficiency of the internal combustion engine, and fit the lock pin into the lock hole when the internal combustion engine stops.

Therefore, the fitting of the lock pin into the lock hole can be certainly realized according to the temperature of the working fluid, in other words, the temperature of the internal combustion engine. Besides, both improved combustion characteristic of the internal combustion engine and reduced production of hydrocarbon (HC) gas can be achieved.

In the variable valve apparatus in accordance with the foregoing aspect of the invention, the first overlap amount may be smaller if the temperature of the working fluid is higher.

According to the foregoing construction, under the condition that the temperature of the working fluid has become low and therefore the viscosity of the working fluid, such as oil or the like, has become high, the position of the vane is set at such a position that when the internal combustion engine stops due to, for example, an engine stall, the lock pin can fit into the lock hole. In addition, under the condition that the temperature of the working fluid is low, the overlap amount is restricted by the second overlap amount if the first overlap amount is larger than the second overlap amount. Therefore, the fitting of the lock pin to the lock hole at the time of stop of the engine is ensured. Besides, in the case where the first overlap amount is less than or equal to the second overlap amount, the position of the vane that corresponds to the first overlap amount is set in such a range that when the engine stops, the lock pin can fit into the lock hole. Therefore, even if the overlap amount is set to the first overlap amount, the lock pin can fit into the lock hole when the engine stops.

In the variable valve apparatus in accordance with the foregoing aspect of the invention, the second overlap amount may be larger if the temperature of the working fluid is higher.

According to this construction, since the second overlap amount, which serves as an upper-limit value of the first overlap amount that the overlap amount can be set to, is made larger if the temperature of the working fluid is higher, the range of the first overlap amount that can be set as the overlap amount can be expanded appropriately when the temperature of the working fluid is relatively high and therefore the viscosity thereof is relatively low.

The variable valve apparatus in accordance with the foregoing aspect may further include correction means for correcting the second overlap amount so that the second overlap amount is smaller if speed of a vehicle that is supplied with power from the internal combustion engine is lower.

According to the foregoing construction, even in the case where it is considered that the smaller the speed of the vehicle that is supplied with power form the internal combustion engine, the more difficult it is to fit the lock pin into the lock hole when the internal combustion engine stops, that is, at the time of stop of the engine, it is possible to fit the lock pin into the lock hole at the time of stop of the internal combustion engine. More specifically, since the smaller the vehicle speed, the smaller the second overlap amount is made so as to make it possible to fit the lock pin into the lock hole at the time of stop of the engine, in other words, since during operation of the internal combustion engine, the position of the vane is restricted so that the second overlap amount is smaller the smaller the vehicle speed, the vane can return to the position at which the fitting of the lock pin into the lock hole is possible, when the engine stops.

In the variable valve apparatus in accordance with the foregoing aspect, the rotation phase variable control means may be connected to the intake-side camshaft so as to change the relative rotation phase of at least the intake-side camshaft relative to the rotation phase of the crankshaft, according to the hydraulic pressure of the working fluid, and the control means may control the rotation phase variable control means so that the intake valve opening timing is changed.

In the variable valve apparatus in accordance with the foregoing aspect, if the first overlap amount is larger than the second overlap amount, the control means may control the rotation phase variable control means so that the overlap amount is made equal to the second overlap amount by advancing the intake valve opening timing.

According to the foregoing construction, since the intake valve opening timing is advanced in order to set the overlap amount, the position of the vane can be restricted so that the lock pin can be certainly fitted into the lock hole, in comparison with the case where the exhaust valve opening timing is retarded. In the case where the internal combustion engine stops operating while the valve opening timing of the intake valve is advanced, the vane is likely to return to the position at which the fitting of the lock pin into the lock hole is possible since the timing of the intake valve (and the exhaust valve) is likely to shift or return in the rotation direction of the internal combustion engine, that is, in the timing retardation direction, when the engine stops.

In the variable valve apparatus in accordance with the foregoing aspect, the rotation phase variable control portion may be connected to the exhaust-side camshaft so as to change at least the relative rotation phase of the exhaust-side camshaft relative to the rotation phase of the crankshaft, according to the hydraulic pressure of the working fluid, and the control portion may control the rotation phase variable control portion so as to change the exhaust valve opening timing.

In the variable valve apparatus in accordance with the foregoing aspect, if the first overlap amount is less than or equal to the second overlap amount, the control portion may control the rotation phase variable control portion so that the overlap amount is made equal to the first overlap amount by retarding the exhaust valve opening timing.

According to this construction, the HC gas can be further reduced, in comparison with the case where the intake valve opening timing is shifted in the timing advancement direction.

In the variable valve apparatus in accordance with the foregoing aspect, if the first overlap amount is larger than the second overlap amount, the temperature of the working fluid may be lower than or equal to $-10°$ C., and if the first overlap amount is less than or equal to the second overlap amount, the temperature may be above $-10°$ C.

In the variable valve apparatus in accordance with the foregoing aspect, at least a portion of the rotation phase variable control portion may be mechanically fixed by the lock pin fitting to the lock hole, and the lock state may be a state in which the relative rotation phase of the intake-side camshaft is a phase in which the vane is positioned furthest to a retarded side in a movable range of the vane.

In the variable valve apparatus in accordance with the foregoing aspect, the rotation phase variable control portion may change the relative rotation phase via the working fluid.

In the variable valve apparatus in accordance with the foregoing aspect, the first overlap amount may be an overlap amount that is requested in order to heighten combustion efficiency of the internal combustion engine.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 10 is a flowchart that sequentially shows major processes of the control method performed by the ECU 100 in accordance with a modification;

FIG. 12 is a flowchart (part 1) that sequentially shows major processes of a control method in accordance with a modification;

FIG. 15 is a map that shows one of various displacement angles that are given priority as the ones that are to be changed in various regions that are defined in relations between the oil temperature TO and the catalyst temperature.

DETAILED DESCRIPTION OF EMBODIMENTS

Hereinafter, embodiments of a control device for a variable valve apparatus in accordance with the invention will be described with reference to the drawings. Incidentally, the "variable valve apparatus" in accordance with the invention may include a physical, mechanical, mechanistic or electrical apparatus, or an apparatus of an appropriate combination of the foregoing apparatuses which is capable of changing the valve opening timing and the valve closure timing of at least one of an intake valve related to intake of air, and an exhaust valve related to the discharge of a burned mixture after the combustion stroke of the combustion chamber (which will, hereinafter, be collectively termed "the valve timing" as appropriate), and in particular, may include rotation phase variation means, and lock means.

Figure 1:
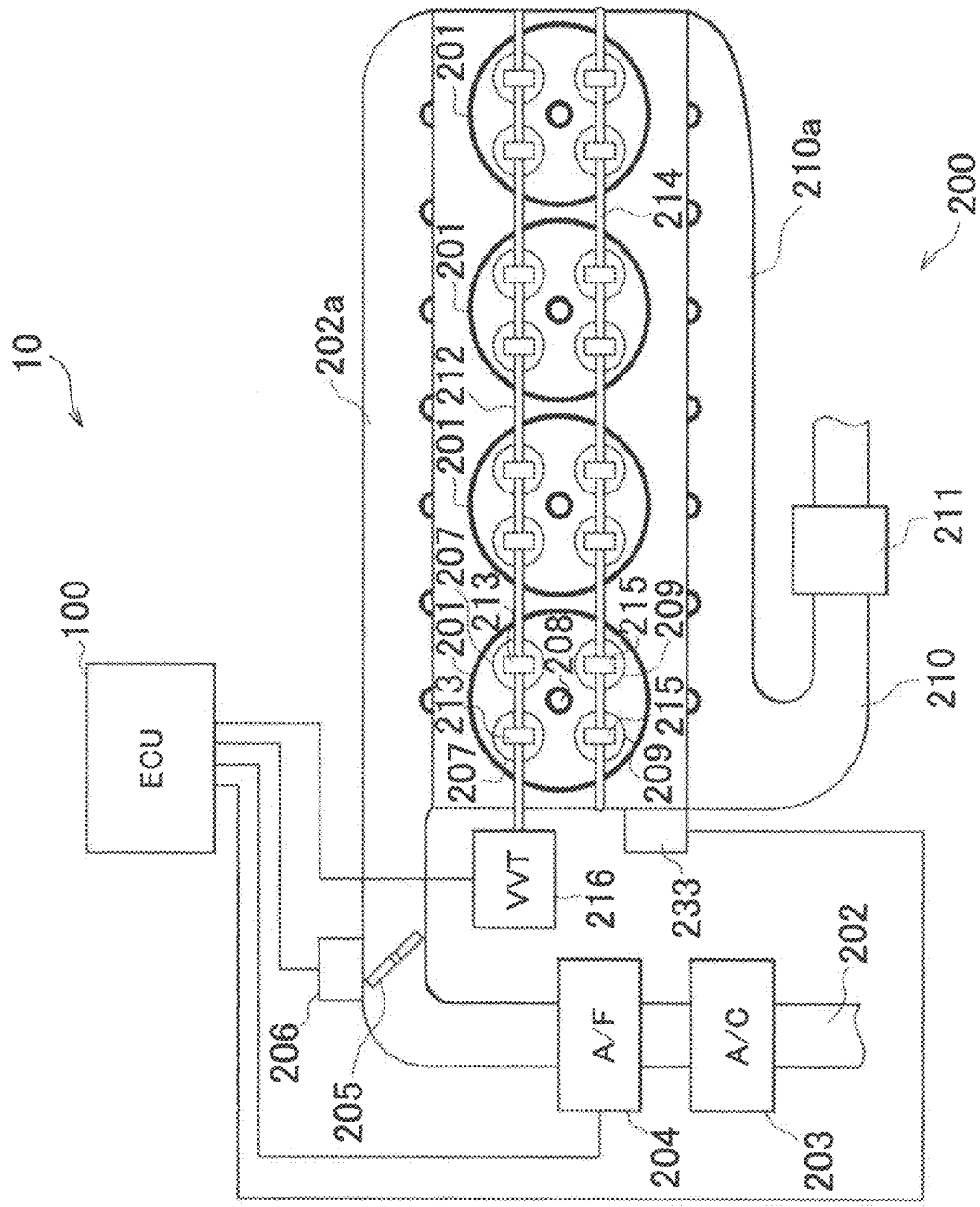
FIG. 1 is a schematic diagram showing a construction of an engine system 10 equipped with a control device for a variable valve apparatus in accordance with an embodiment of the invention.

Firstly, a construction of an engine system equipped with a control device for a variable valve apparatus in accordance with an embodiment of the invention will be described with reference to FIGS. 1 to 5. FIG. 1 is a schematic diagram showing a construction of an engine system 10 equipped with a control device for a variable valve apparatus in accordance with an embodiment of the invention.

In FIG. 1, the engine system 10 includes an ECU 100, an example of a "control device" in accordance with the invention, and an engine 200 that is an example of an "internal combustion engine" in the invention. The engine 200 has a plurality of cylinders, and is constructed so that a mixture containing fuel, such as gasoline or the like, which is injected to an intake system, such as an intake pipe, an intake port, etc., or directly into the combustion chamber in a cylinder, is combusted, and explosion force caused by the combustion is extracted as power appropriately via, for example, the piston, the connecting rod, the crankshaft, etc.

The ECU 100 is an electronic control unit that includes a CPU (central processing unit), a ROM (read-only memory), a RAM (random access memory), etc. (which are not shown), and that controls action of the engine 200.

The engine 200 is a gasoline engine that is a motive power source of a vehicle (not shown). Construction of portions of the engine 200 will be described in conjunction with some actions thereof.

The engine 200 is an in-line four-cylinder engine in which four cylinders 201 are disposed in line in a cylinder block. The engine 200 is constructed so as to be able to convert reciprocating motion of pistons (not shown) within the individual cylinders that are caused by combustion of mixture of air and fuel within the cylinders, into rotary motion via connecting rods and a crankshaft (which are not shown). The rotational position of the crankshaft is constantly detected by a crank position sensor (not shown) that is electrically connected to the ECU 100, and is therefore always accurately kept track of by the ECU 100 via a predetermined control bus, and is used by the ECU 100 for various controls of, for example, the valve timing, the ignition timing, etc. (which will be described below). The term "timing" in the valve timing is not a concept of time, but a concept of angle that is defined by the crank angle or by an index that is associated in correspondence with the crank angle, and a concept that corresponds to a period that has a width in time. Therefore, making the valve opening timing or the valve closure timing relatively earlier or later is also expressed as "advancing" the timing or "retarding" the timing.

When the engine 200 operates, air taken in from outside is led into an intake pipe 202, and is purified by an air cleaner 203, and then is supplied to an intake manifold 202a that communicates with the individual cylinders. Besides, the intake air amount of air taken in is detected by an air flow meter 204 that is positioned downstream of the air cleaner 203. The air flow meter 204 is electrically connected to the ECU 100, so that the intake air amount detected by the air flow meter 204 is constantly kept track of by the ECU 100.

The intake pipe 202 is provided with a throttle valve 205. According to the degree of opening thereof, the intake air amount supplied to the intake manifold 202a is controlled. The throttle valve 205 is an electronically controlled throttle valve that is driven by an electrical actuator, such as a throttle valve motor (not shown) or the like, and is electrically connected to the ECU 100. The degree of opening of the throttle valve 205 is controlled by the ECU 100 according to, for example, the operation amount of an accelerator pedal (not shown), or independently of the operation amount of the accelerator pedal. Besides, the throttle opening degree, that is, the degree of opening of the throttle valve 205, is detected by a throttle opening degree sensor 206 that is provided near the throttle valve 205. The throttle opening degree sensor 206 is electrically connected to the ECU 100, so that the throttle opening degree detected by the ECU 100 is constantly kept track of by the ECU 100.

A mixture of air supplied via the intake manifold 202a and fuel supplied into the intake ports (not shown) of each cylinder 201 that communicate with the intake manifold 202a, by injection from, for example, an electronically controlled fuel injector (not shown) or the like, is taken into the combustion chamber of each cylinder 201, via two intake valves 207. In this case, the mixture is supplied into the combustion chamber of each cylinder when the intake valves 207 are open. In a fuel supply system including the injectors and the like is electrically connected to the ECU 100, so that the amount of fuel injection from the fuel supply system and the injection timing (injection crank angle) are controlled by the ECU 100.

Within the combustion chamber of each cylinder, the air-fuel mixture burns due to the ignition by an ignition plug 208 during the combustion stroke. The ignition plug 208 is electrically connected to the ECU 100 (a line of control therebetween is not shown), so that the ignition timing (ignition crank angle) of the ignition plug 208 is controlled by the ECU 100. The burned mixture in the combustion chamber is discharged as exhaust gas into exhaust ports (not shown) when two exhaust valves 209 that communicate with the exhaust ports are open. The exhaust gas is emitted via an exhaust manifold 210a that communicates with the exhaust ports, and via an exhaust pipe 210.

The exhaust pipe 210 is provided with a three-way catalyst 211, whereby the exhaust gas discharged into the exhaust pipe 210 is purified. The exhaust gas is also purified by another catalytic device that is disposed downstream of the three-way catalyst 211, before being emitted to the outside of the vehicle. In a water jacket housed within the cylinder block of the engine 200, cooling water is supplied and circulated. The cooling water temperature Tw, that is, the temperature of cooling water, is detected by a water temperature sensor 233, and is constantly kept track of by the ECU 100, which is electrically connected to the water temperature sensor 233.

The opening and closing actions of the intake valves 207 are controlled by intake cams 213 that are fixed to an intake camshaft 212 (i.e., an example of an "intake-side camshaft" in the invention) corresponding to the individual intake valves 207. The intake camshaft 212 is rotatably supported on a cylinder head (not shown).

On the other hand, the opening and closing actions of the exhaust valves 209 are controlled by exhaust cams 215 that are fixed to an exhaust camshaft 214 (i.e., an example of an "exhaust-side camshaft" in the invention) corresponding to the individual exhaust valves 209. The exhaust camshaft 214 is rotatably supported on the cylinder head (not shown).

In the embodiment, in particular, a VVT controller 216 is provided near an end portion of the intake-side camshaft 212, so that the valve timing of the intake valve 207 can be variably controlled.

Figure 2:
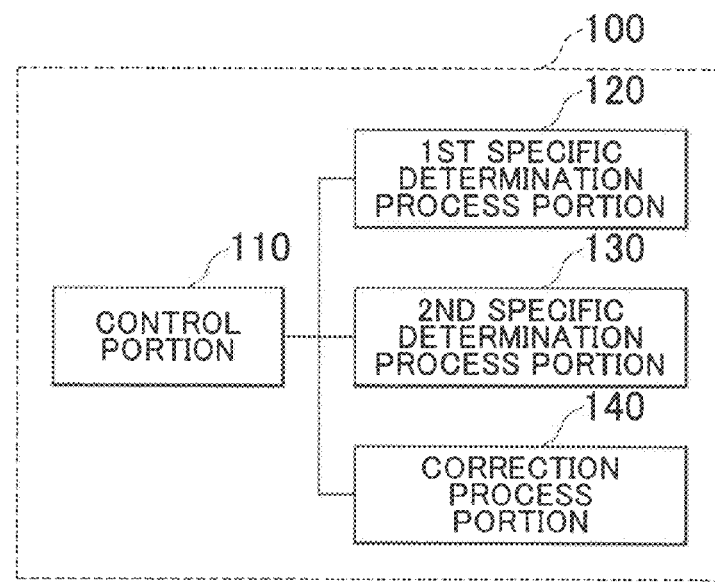
FIG. 2 is a block diagram that diagrammatically shows major ones of electrical component elements of an ECU.

Next, an electrical construction of the ECU 100 will be described with reference to FIG. 2. FIG. 2 is a block diagram that diagrammatically shows major ones of electrical component elements of the ECU 100.

In FIG. 2, the ECU 100 includes a first specific determination process portion 120 as an example of "first specific determination means (first specific determination portion)" in the invention, a second specific determination process portion 130 as an example of "second specific determination means (second specific determination portion)" in the invention, a correction process portion 140 as an example of "correction means (correction portion)" in the invention, and a control portion 110 as an example of "control means" in the invention. The ECU 100 is able to control the entire actions of the VVT controller 216 and the engine system 10, which will be described later.

Figure 3:
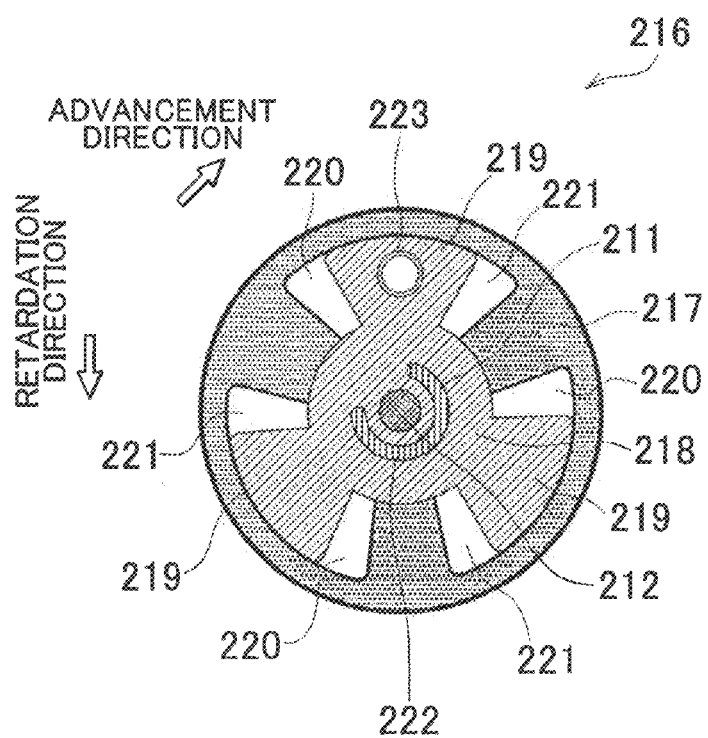
FIG. 3 is a schematic sectional view of a VVT controller taken along a plane orthogonal to an intake camshaft.

With reference to FIG. 3, a construction of the VVT controller 216 will be described. FIG. 3 is a schematic sectional view of the VVT controller 216 taken on a plane orthogonal to the axis of the intake camshaft 212.

In FIG. 3, the VVT controller 216 includes a housing 217, and a rotor 218.

The housing 217 is fixed to a sprocket (not shown) by fastening it with a bolt or the like. The sprocket is pivotably supported on an outer periphery of the intake camshaft 212 that stretches in a direction perpendicular to the plane of the sheet of FIG. 3. Since rotation of the crankshaft of the engine 200 is transmitted to the sprocket and the housing 217 via a timing chain, the sprocket and the housing 214 are rotatable synchronously with the crankshaft.

The intake camshaft 212 is rotatably supported by the cylinder head and a bearing cap of the engine 200. The rotor 218 is fixed to an end portion of the rotatably supported intake camshaft 212 by fastening it with a bolt, via a stopper, and is thus rotatably housed within the housing 217. Besides, a plurality of liquid chambers are formed within the housing 217. Each chamber is divided into an advancement chamber 220 and a retardation chamber 221 by a vane 219 that is formed on an outer peripheral portion of the rotor 218. One of the plurality of vanes 219 formed on the rotor 218 has a lock hole 223. Operation of the lock hole 223 will be described later.

A retardation-side channel portion 222 is formed in an annular shape around the outer periphery of the intake camshaft 212. The retardation-side channel portion 222 communicates with each of the retardation chambers 221 via a hydraulic pressure channel (not shown). Besides, an advancement-side channel portion (not shown) is formed in an annular shape, similarly to the retardation-side channel portion 222, around the outer periphery of the intake camshaft 212, and communicates with each of the advancement chambers 220 via a hydraulic pressure channel (not shown).

The VVT controller 216 is equipped with a hydraulic pressure transmission system 225 that includes hydraulic pressure channels such as the retardation-side channel portion 222, the advancement-side channel portion, etc.

Figure 4:
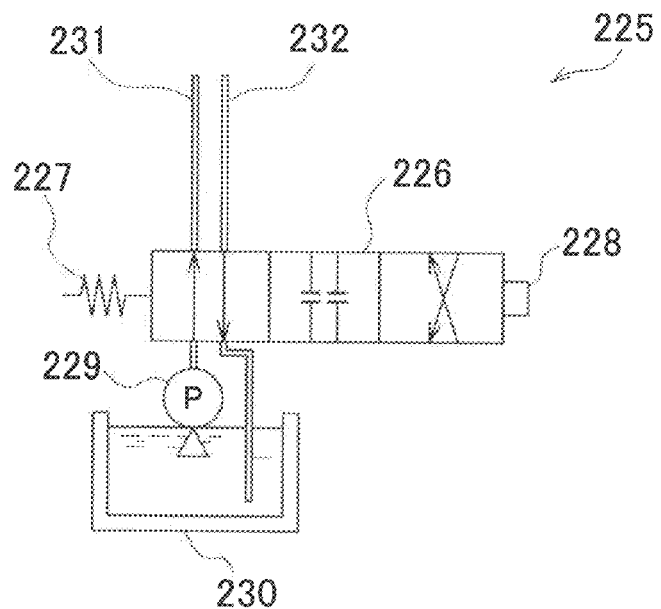
FIG. 4 is another schematic diagram of portions of the VVT controller.

Next, the hydraulic pressure transmission system 225 will be described with reference to FIG. 4. FIG. 4 is a schematic view that diagrammatically shows a construction of the hydraulic pressure transmission system 225.

In FIG. 4, the hydraulic pressure transmission system 225 includes a hydraulic pressure control valve 226 that is driven by a spring 227 and a solenoid 228.

The hydraulic pressure control valve 226 is constructed so that the position of a valve body can be switched among an advancement position at which hydraulic pressure is transmitted to the advancement chambers 220, a retardation position at which hydraulic pressure is transmitted to the retardation chambers 221, and a non-transmission position at which hydraulic pressure is not transmitted to either the advancement chambers 220 or the retardation chambers 221. The solenoid 228 is electrically connected to the ECU 100 via a drive system (not shown), so as to be able to change the position of the valve body of the hydraulic pressure control valve 226 according to the solenoid current that is controlled by higher-order control of the ECU 100.

The spring 227 is an elastic member that urges the hydraulic pressure control valve 226 in the rightward direction in FIG. 4. In the case where electric current is not supplied to the solenoid 228, the hydraulic pressure control valve 226 is urged by the spring 227 to stop at the retardation position as shown in FIG. 4.

The hydraulic pressure transmission system 225 includes a pump 229. The pump 229 works by power from the engine 200, and is able to pump a portion of lubrication oil of the engine 200 (i.e., an example of "working fluid" in the invention) from an oil pan 230, and circulates and supplies the oil to various portions of the VVT controller 216.

The oil circulated and supplied by the pump 229 is supplied to the retardation chambers 221 and the advancement chambers 220 via a retardation-side delivery path 231 and a advancement-side delivery path 232 that are connected to the hydraulic pressure control valve 226, and also via the retardation-side channel portion 222 and the advancement-side channel portion, etc. that are connected to the retardation-side delivery path 231 or the advancement-side delivery path 232.

With regard to the VVT controller 216, the following three kinds of control modes are executed.

Figure 5:
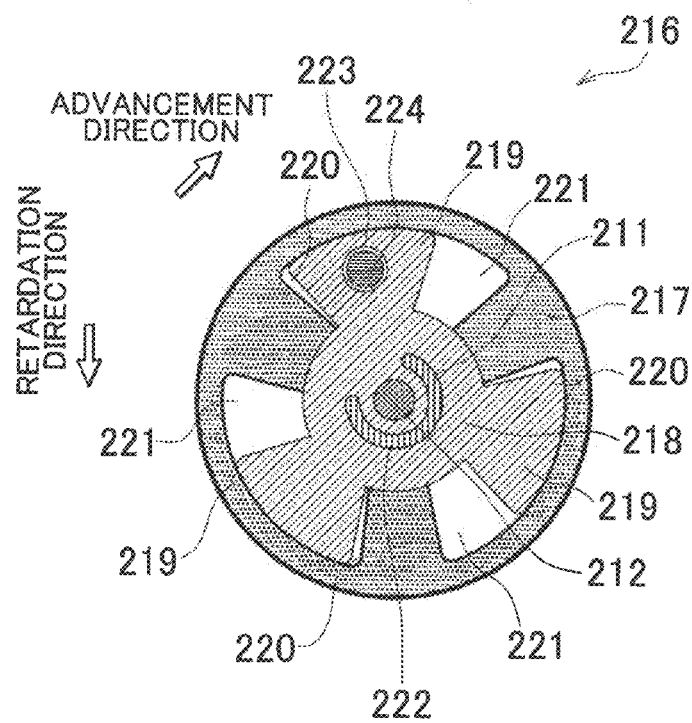
FIG. 5 is a schematic sectional view of a VVT controller similar to the VVT controller shown in FIG. 3.

In FIG. 5, a hold mode is entered when the valve body is controlled to the non-transmission position of the hydraulic pressure control valve 226 while at least a predetermined value of hydraulic pressure is applied to the advancement chambers 220 and the retardation chambers 221 via the hydraulic pressure transmission system 225. During the hold mode, since the hydraulic pressure in the advancement chambers 220 and the retardation chambers 221 is maintained, each vane 209 is fixed in position by both the hydraulic pressure in the advancement chamber 220 and the hydraulic pressure in the retardation chamber 221. Along with rotation of the crankshaft, rotation of the housing 217 is transmitted to the rotor 218 and the vanes 219. Therefore, the intake camshaft 212 fixed to the rotor 218 is rotationally driven integrally with the rotor 218, with a constant rotation phase difference maintained between the intake camshaft 212 and the crankshaft.

If the hydraulic pressure in the advancement chambers 220 and the retardation chambers 221 is changed, the vanes 219 pivot in the advancement direction or the retardation direction within a predetermined movement range, according to the hydraulic pressures in both side chambers. At this time, since the rotor 218 on which the vanes 219 are formed also pivot along with the pivot of the vanes 219, the rotation phase of the intake camshaft 212 changes relative to the rotation phase of the crankshaft, that is, the rotation phase difference of the intake camshaft 212 from the crankshaft changes, so that the valve timing of the intake valves 207 fixed to the intake camshaft 212 changes.

In a feedback mode, the ECU 100 computes a target displacement angle of the valve timing of the intake valves 207 according to the operation condition of the engine 200 at the current time point, and controls the solenoid 228 by supplying a signal that corresponds to the feedback electric current value to a drive system that drives the solenoid 228. In consequence, during the feedback mode, the rotation phase difference of the intake camshaft 212 converges to a desired value in a feedback manner.

During a period during which the engine 200 is in a stopped state, or a certain period immediately following the starting of the engine 200, a forced greatest retardation mode is executed. The forced greatest retardation mode will be described with reference to FIG. 5. FIG. 5 is a schematic sectional view of the VVT controller 216 as shown in FIG. 3. In FIG. 5, portions and the like that are the same as those in FIG. 3 are represented by the same reference numerals, and descriptions thereof will be appropriately omitted.

In FIG. 5, if the hydraulic pressure of oil supplied to the VVT controller 216 declines to or below a value that is needed for the driving of the vanes 219 as the engine 200 stops, the vanes 219 pivot to the retardation side due to friction, so that the rotation phase of the intake camshaft 212 gradually changes to the retardation side to finally reach a most retarded state (i.e., a state in which the vanes 219 are positioned the furthest to the retardation side in the movement range). In the embodiment, the mode of forcing the position of the vanes 219 to be fixed to the most retarded position is termed the forced greatest retardation mode.

At the site that corresponds to the most retarded position of the vane 219 in which the lock hole 223 is formed, a lock pin 224 is provided so as to be capable of being fitted and not being fitted into the lock hole 223. The lock pin 224 is normally urged by a coil spring (not shown) in such a direction as to be fitted into the lock hole 223. When oil at a hydraulic pressure that is higher than or equal to a predetermined release hydraulic pressure (the release hydraulic pressure being higher than the hydraulic pressure that is needed in order to pivot the vanes 219) is supplied to the lock hole 223, and the hydraulic pressure overcomes the urging of the coil spring, the lock pin 224 is withdrawn into a predetermined housing hole that is formed so that the pivot of the vanes 219 is not inhibited. Therefore, when the vanes 219 stop at the most retarded position as the engine 200 stops, that is, at the time of stop of engine operation, the lock pin 224 is urged by the coil spring to fit into the lock hole 223, so that the pivot of the vanes 219 is mechanically prevented, that is, locked.

A supply path of oil to the lock hole 223 also serves as a supply path of oil to the retardation chambers 221, so that the hydraulic pressure in the lock hole 223 is kept substantially equal to the hydraulic pressure in the retardation chambers 221. Therefore, when the hydraulic pressure in the retardation chambers 221 becomes equal to or higher than a release hydraulic pressure that can discontinue the locked state, the lock held by the lock pin 224 is released, so that physically, the vanes 219 can be pivoted, that is, the valve timing of the intake valves 207 can be variably controlled.

If the solenoid 228 is not electrified, the valve body of the hydraulic pressure control valve 226 stops at the retardation position, so that if the hydraulic pressure in the retardation chambers 221 rises to or above the release hydraulic pressure as the hydraulic pressure of oil rises after the engine 200 is started, the locked state of the lock pin 224 can be released.

Next, faults that can occur in the engine system 10 will be described with reference to FIGS. 1 to 3, FIG. 5, and FIGS. 6A to 6D. FIGS. 6A to 6D are graphs that diagrammatically show changes in the friction, the engine load, the relation between the values of the displacement angles of the intake valve (IN) and the exhaust valve (EX) such that the entrance of the lock pin can be achieved and the requested amount of overlap between the intake and exhaust valves, and the returning speed of the vanes 219, with respect to the temperature of oil as an example of the working fluid (hereinafter, referred to as "oil temperature").

Figure 6A:
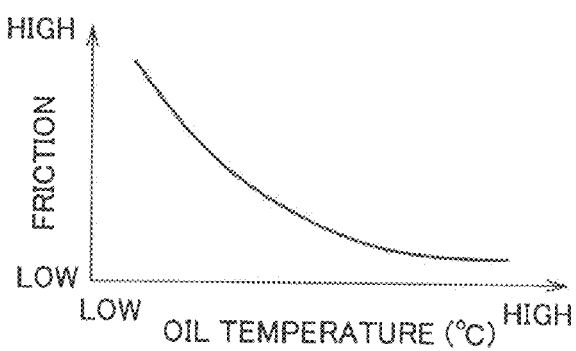
FIGS. 6A to 6D are graph showing changes in the friction, the engine load, the relation between the values of the displacement angle of an intake valve (IN) and an exhaust valve (EX) such that the entrance of a lock pin can be achieved and the requested amount of overlap between the valves, and the returning speed of vanes, with respect to the oil temperature.
Figure 6B:
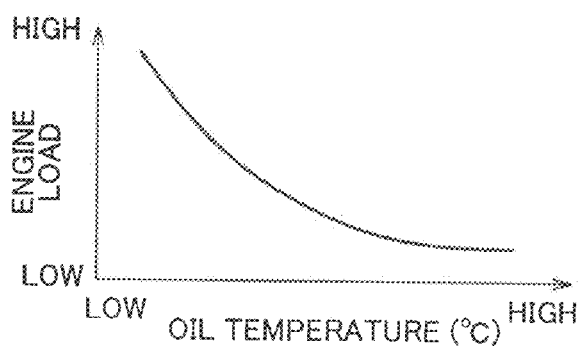
Figure 6C:
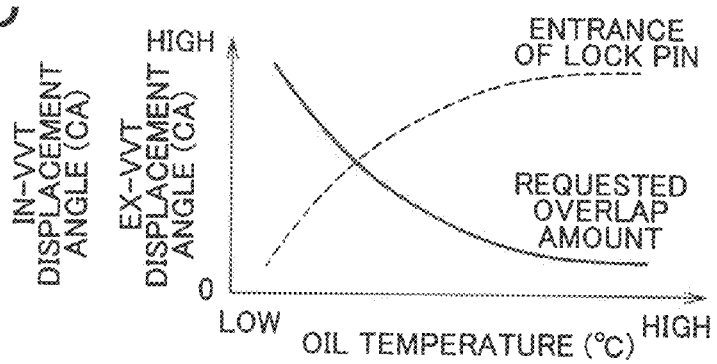
Figure 6D:
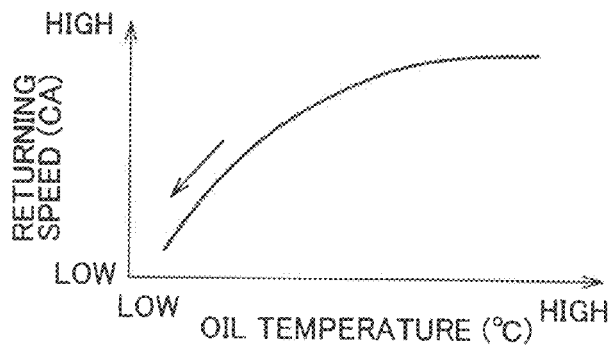

As shown in FIG. 6A, the friction declines as the oil temperature rises. This is because as the oil temperature rises, the viscosity of the oil as a working fluid declines. As shown in FIG. 6B, the load that acts on the engine 200 declines as the oil temperature rises, that is, as the friction declines. As shown in FIG. 6C, both the displacement angle of the intake valves (IN-VVT displacement angle) and the displacement angle of the exhaust valves (EX-VVT displacement angle) such that the lock pin 224 can fit into the lock hole 223 when the engine 200 stops increase with the oil temperature. On the other hand, the overlap amount that is requested in order to heighten the combustion efficiency of fuel in the engine 200, that is, the amount of overlap between the displacement angle of the intake valves and the displacement angle of the exhaust valves, declines with rises in the oil temperature. As shown in FIG. 6D, the returning speed of the vanes 219, that is, the speed at which the vanes 219 move to the position at which the lock pin 224 can fit into the lock hole 223, declines as the oil temperature declines. This is because the temperature declines, the viscosity of the oil as a working fluid increases, so that the resistance force that acts on the vanes 219 from the oil increases so as to inhibit the movement of the vanes 219.

Therefore, if the temperature becomes low, it becomes difficult to fix the rotation phases of the crankshaft and the intake-side camshaft when the engine 200 stops operating. If the engine 200 stops operating while the vanes 219 are moving, the vanes 219 cannot promptly move to the position at which the vanes 219 are designed to be fixed at the time of stop of engine operation, and thus it becomes difficult to accurately fit the lock pin 224 into the lock hole 223 formed in one of the vanes 219. Moreover, it is also necessary to achieve both improved combustion characteristic of the engine and reduced production of hydrocarbon (HC) gas by setting the amount of overlap between the open timing of the intake valves and the open timing of the exhaust valves during which the valves are open.

Therefore, the positional fixation of the vanes 219 by the fitting of the knock pin into the knock hole, and improvement of the combustion characteristic of the fuel as well as reduction of the HC gas can be achieved by a peculiar construction and a peculiar process operation of the ECU 100 of this embodiment, as described below.

Figure 7:
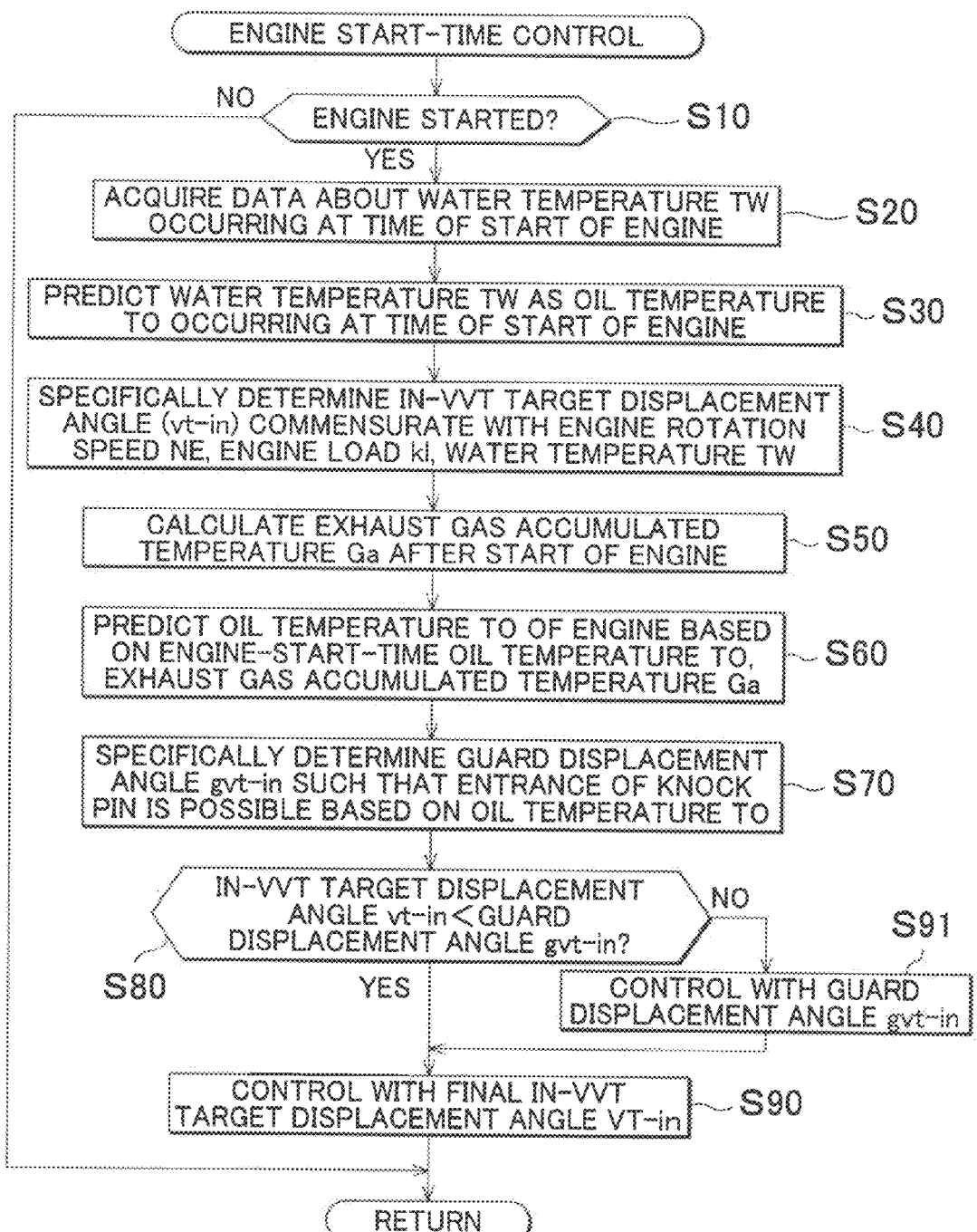
FIG. 7 is a flowchart that sequentially shows major processes of a control method for the VVT controller which is executed under the control of an ECU.

Next, a control method for the valve timing by the VVT controller which is executed under the control of the ECU 100 will be described with reference to FIG. 7. FIG. 7 is a flowchart sequentially showing major processes of the control method of the VVT controller which is executed under the control of the ECU 100.

In FIG. 7, the control portion 110 determines whether or not the engine 200 has started (step S10). If it is determined that the engine 200 has not started, the process of step S10 is executed again. Next, the control portion 110 acquires data regarding the water temperature Tw at the time of start of the engine 200 from detection means such as a temperature sensor, or the like (step S20). Next, under the control of the control portion 110, the first specific determination process portion 120 that has acquired data about the water temperature Tw from the control portion 110 predicts the acquired water temperature Tw as an oil temperature TO occurring at the time of start of the engine 200 (step S30). Incidentally, the first specific determination process portion 120, instead of predicting the oil temperature TO from the water temperature Tw, may also acquire data about the oil temperature TO directly from temperature detection means, such as a temperature sensor or the like, which is capable of measuring the temperature of the oil as a working fluid, that is, the oil temperature TO. Next, the first specific determination process portion 120 specifically determines an IN-VVT target displacement angle vt-in as an intake valve target displacement angle on the basis of the rotation speed Ne of the engine 200, the load KL that acts on the engine 200, and the oil temperature TO (step S40). Due to the specific determination of the IN-VVT target displacement angle vt-in, an overlap amount that is to be set as a target is specifically determined as an overlap amount OL of overlap between the intake valve opening timing during which the intake valves 207 are open, and the exhaust valve opening timing during which the exhaust valves 209 are open. The overlap amount that is to be set as a target is an example of a "first overlap amount" in the invention.

A purpose in referring to the rotation speed Ne of the engine 200 and the load KL that acts on the engine 200 at the time of the specific determination of an overlap amount that is to be a target, that is, the specific determination of an IN-VVT target displacement angle vt-in, is to realize reduction of production of HC gas during operation of the engine 200 and restraint of the decline in the combustion efficiency that is caused by residual gas that remains in the engine 200. A reason for referring to the oil temperature TO in addition to the rotation speed Ne of the engine 200 and the load KL that acts on the engine 200 is that, depending on the oil temperature TO, that is, depending on the temperature of the engine 200 that corresponds to the oil temperature TO, the amount of residual gas that remains in the engine 200 changes, and the overlap amount for realizing an optimum combustion state changes.

Next, the control portion 110 calculates an accumulated temperature of exhaust gas Ga obtained by accumulating the temperature of exhaust gas produced after the engine 200 is started (step S50). Next, the control portion 110 predicts an oil temperature TO of the engine 200 on the basis of the oil temperature TO at the time of start of the engine 200, and the exhaust gas accumulated temperature Ga. Next, the second specific determination process portion 130 specifically determines a guard displacement angle gvt-in that restricts the displacement angle of the intake valves 207 so that when the engine 200 stops, that is, at the time of stop of the engine, the relative phase of the rotation of the intake camshaft 212 to the rotation of the crankshaft can be fixed, more concretely, the lock pin 224 will fit into the lock hole 223 so as to mechanically fix, that is, lock, the pivot of the vanes 219 (step S70). Due to the specific determination of the guard displacement angle gvt-in, the overlap amount at which the lock pin 224 is fitted into the lock hole 223, and therefore the pivot of the vane 219 is mechanically fixed, that is, locked, in other words, the overlap amount that is an example of a "second overlap amount" in the invention, is specifically determined.

Next, the control portion 110 determines whether or not the IN-VVT target displacement angle vt-in is smaller than the guard displacement angle gvt-in (step S80). If it is determined that the IN-VVT target displacement angle vt-in is smaller than the guard displacement angle gvt-in, the control portion 110 uses the IN-VVT displacement angle vt-in as a final IN-VVT displacement angle VT-in that is set at the time of control of the VVT controller 216 (step S90). In other words, in the case where the overlap amount that corresponds to the IN-VVT target displacement angle vt-in is less than the overlap amount that corresponds to the guard displacement angle gvt-in, the control portion 110 controls the VVT controller 216 so that the VVT controller 216 sets the displacement angle of the intake valve 207 to the IN-VVT displacement angle vt-in (step 90). On the other hand, if the IN-VVT displacement angle vt-in is greater than or equal to the guard displacement angle gvt-in, the control portion 110 sets the guard displacement angle gvt-in as the final IN-VVT displacement angle VT-in, and controls the action of the VVT controller 216 (step S90).

Figure 8:
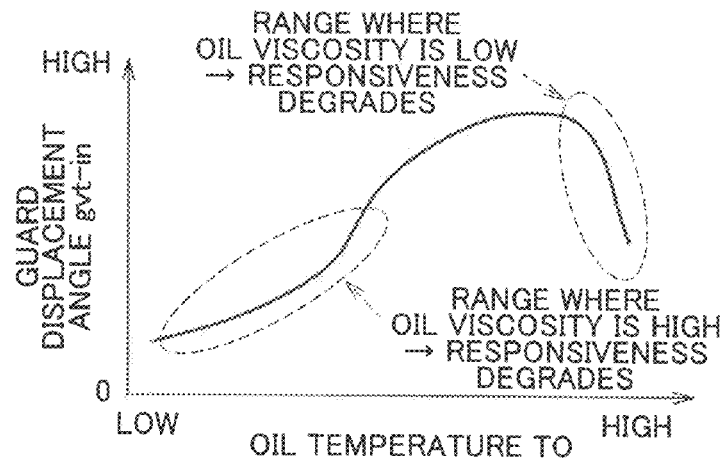
FIG. 8 is a graph showing a relation between the oil temperature and the guard displacement angle of the intake valves.
Figure 9A:
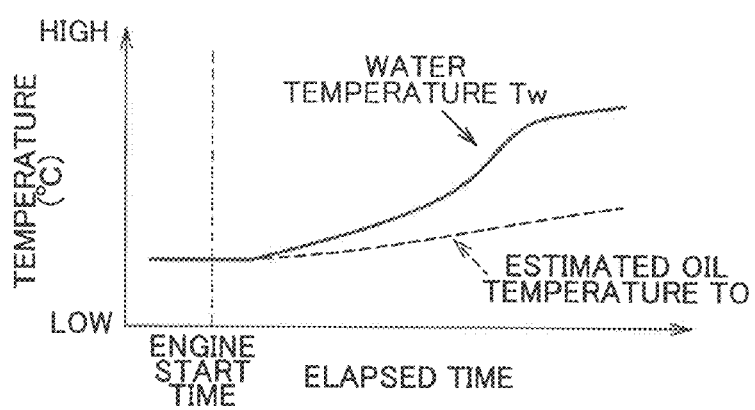
FIG. 9A is a graph showing changes in the water temperature Tw and in the estimated oil temperature TO with respect to the elapsed time from the start of the engine.
Figure 9B:
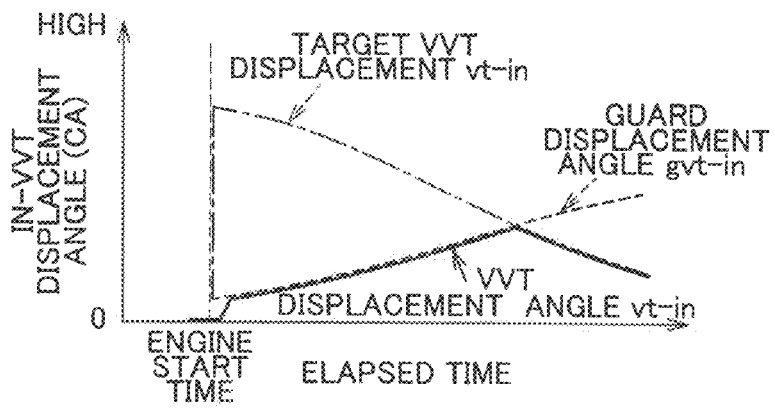
FIG. 9B is a graph showing that the target displacement angle that is to be a target of the displacement angle of the intake valves (target VVT displacement angle vt-in), the guard displacement angle gvt-in of the intake valves, and the VVT displacement angle vt-in of the intake valves change with the foregoing elapsed time.

Next, a reason for the setting of the displacement angle of the intake valves 207 will be explained in detail with reference to FIG. 8, and FIGS. 9A and 9B. FIG. 8 is a graph showing a relation between the oil temperature TO and the guard displacement angle of the intake valves. FIG. 9A is a graph showing changes in the water temperature Tw and in the estimated oil temperature TO with respect to the elapsed time from the start of the engine 200. FIG. 9B is a graph showing that the target displacement angle that is to be a target of the displacement angle of the intake valves (target VVT displacement angle vt-in), the guard displacement angle gvt-in of the intake valves, and the VVT displacement angle vt-in of the intake valves change with the foregoing elapsed time.

As shown in FIG. 8, it is known that the lower the oil temperature TO is, the smaller the guard displacement angle gvt-in tends to become. This is because decline in the oil temperature TO increases the viscosity of the oil as a working fluid. Therefore, the guard displacement angle gvt-in that is an upper limit of such displacement angle that the position of the vanes 219 can be changed to the position at which the lock pin 224 can be fitted into the lock hole 223 is smaller the lower the oil temperature TO, in other words, the lower the temperature of the environment in which the engine system 10 operates. Therefore, the control of the VVT controller 216 by the ECU 100 is more effective the lower the oil temperature TO, that is, the lower the temperature of the environment in which the engine system 10 operates.

As shown in FIG. 9A, the longer the elapsed time from the start of the engine 200, the larger the difference between the water temperature Tw and the estimated oil temperature TO. Therefore, it is more preferable to specifically determine the IN-VVT displacement angle vt-in on the basis of the estimated oil temperature TO than on the basis of the water temperature Tw.

As shown in FIG. 9B, the IN-VVT target displacement angle vt-in and the guard displacement angle gvt-in reverse their size comparison relationship as the elapsed time from the start of the engine 200 increases. Therefore, if the IN-VVT target displacement angle vt-in is greater than the guard displacement angle gvt-in, the guard displacement angle gvt-in is set as the IN-VVT displacement angle vt-in. On the other hand, if the IN-VVT target displacement angle vt-in is less than the guard displacement angle gvt-in, the IN-VVT target displacement angle vt-in is set as the IN-VVT displacement angle vt-in.

Besides, the guard displacement angle gvt-in is greater the higher the oil temperature TO. Therefore, the higher the oil temperature TO of oil as a working fluid, the broader the settable range of the IN-VVT displacement angle vt-in can be made; for example, it becomes possible to set large guard displacement angle gvt-in by retarding the valve opening timing of the exhaust valves 209.

According to the ECU 100 that is capable of the foregoing controls, the fitting of the lock pin 224 to the lock hole 223 can be certainly realized according to the oil temperature TO of the oil as a working fluid, in other words, according to the temperature of the engine 200, and both improved combustion characteristic of the engine 200 and reduced production of hydrocarbon (HC) can be achieved.

Incidentally, according to the ECU 100 in accordance with the embodiment, the IN-VVT target displacement angle vt-in becomes smaller the lower the oil temperature TO of the oil as a working fluid, that is, the lower the temperature of the engine 200. More concretely, when the engine 200 stops, for example, due to an engine stall, under the condition that the oil temperature TO of the oil as a working fluid is low and, therefore, the viscosity of the oil is high, the position of the vanes 219 is set to a position at which the lock pin 224 can be fitted into the lock hole 223. In addition, even under the condition of low oil temperature TO, in the case where the IN-VVT target displacement angle vt-in is larger than the guard displacement angle gvt-in, the IN-VVT target displacement angle vt-in is restricted by the guard displacement angle gvt-in, so that the fitting of the lock pin into the lock hole at the time of stop of the engine is secured. Besides, in the case where the IN-VVT target displacement angle vt-in is equal to or less than the guard displacement angle gvt-in, since the position of the vanes 219 that corresponds to the IN-VVT target displacement angle vt-in is set within such a range that the lock pin can be fitted into the lock hole at the time of stop of the engine. Therefore, if the IN-VVT displacement angle vt-in is set at the IN-VVT target displacement angle vt-in, the lock pin 224 can be fitted into the lock hole 223 (the entrance of the lock pin is possible) at the time of stop of the engine.

Besides, according to the ECU 100, for example, in the case where the IN-VVT target displacement angle vt-in is lessened according to the oil temperature of the oil as a working fluid, it suffices, for example, to advance the opening timing of the intake valves 207. This is because, in the case where the engine 200 stops with advanced opening timing of the intake valve 207, the timing of the intake valves 207 and the exhaust valves 209 is likely to shift or return in the rotation direction of the engine 200, that is, in the retardation direction, and therefore, the position of the vanes 219 is likely to shift or return to the position at which the lock pin 224 can be fitted into the lock hole 223.

Besides, according to the control method in accordance with the embodiment, the control portion 110 performs a process of executing a control of changing the intake valve opening timing through the use of the function of controlling the opening/closing timing of the intake valves 207, among the control functions that the VVT controller 216 performs. Since the control portion 110 shifts the intake valve opening timing in the advancement direction, the position of the vanes 219 can be restricted so that the lock pin 224 can be certainly fitted into the lock hole 223, in comparison with the case where the exhaust valve opening timing is retarded.

Next, a method of controlling the VVT controller 216 by the ECU 100 in accordance with a first modification of the embodiment will be described with reference to FIG. 10 and FIGS. 11A to 11D. FIG. 10 is a flowchart that sequentially shows major processes of the control method performed by the ECU 100 in accordance with this modification. FIG. 11A to FIG. 11D are graphs that diagrammatically show changes in various physical quantities with the elapsed time following the start of the engine 200.

Incidentally, the processes that are the same as in the above-described control method whereby the ECU 100 controls the VVT controller 216 are represented by the same reference characters, and detailed descriptions thereof are omitted below.

Referring to FIG. 10, the ECU 100 executes the process of steps S10 to S70 as in the foregoing control method. Next, the correction process portion 140 that constitutes the ECU 100, together with the first specific determination process portion 120, the second specific determination process portion 130, and the control portion 110, specifically determines a correction amount K of the guard displacement angle gvt-in on the basis of the oil temperature TO, and the vehicle speed V of a vehicle in which the engine system 10 is mounted (step S71). It is to be noted herein that the correction amount K is set so that the guard displacement angle gvt-in becomes smaller the smaller the speed V of the vehicle that is equipped with the engine system 10 and that is supplied with power from the engine system 10. Next, the correction process portion 140 sets a new guard displacement angle Gvt-in by correcting the guard displacement angle gvt-in with the correction amount K (step S72).

The control portion 110 determines whether or not the IN-VVT target displacement angle vt-in is smaller than the guard displacement angle Gvt-in (step S81). If it is determined that the IN-VVT target displacement angle vt-in is smaller than the guard displacement angle Gvt-in, the control portion 110 uses the IN-VVT displacement angle vt-in as a final IN-VVT displacement angle VT-in that is set when the VVT controller 216 is controlled (step S93). In other words, in the case where the overlap amount that corresponds to the IN-VVT target displacement angle vt-in is less than the overlap amount that corresponds to the guard displacement angle Gvt-in, the control portion 110 controls the VVT controller 216 so that the displacement angle of the intake valves 207 is made equal to the IN-VVT displacement angle vt-in by the VVT controller 216. On the other hand, in the case where the IN-VVT target displacement angle vt-in is greater than or equal to the guard displacement angle Gvt-in, the control portion 110 sets the guard displacement angle Gvt-in as a final IN-VVT displacement angle VT-in (step S92), and accordingly controls the action of the VVT controller 216 (step S93).

According to the control method in accordance with this modification, even in the case where it is considered that the smaller the speed V of the vehicle that is supplied with power form the engine 200, the more difficult it is to fit the lock pin 224 into the lock hole 223 when the engine 200 stops, that is, at the time of stop of the engine 200, it is possible to fit the lock pin 224 into the lock hole 223 at the time of stop of the engine 200. More concretely, the lower the vehicle speed V, the smaller the overlap amount is made down to the overlap amount that corresponds to the guard displacement angle Gvt-in, in order to fit the lock pin 224 into the lock hole 223 at the time of stop of the engine. In other words, the position of the vanes 219 is restricted so that the overlap amount that corresponds to the guard displacement angle Gvt-in during the action of the engine 200 can be assumed. Therefore, at the time of stop of the engine, the vanes 219 can be moved to a position at which the lock pin 224 can be fitted into the lock hole 223.

Next, a reason why the guard displacement angle gvt-in of the intake valves 207 is corrected will be explained in detail with reference to FIG. 11A to FIG. 11D.

Figure 11A:
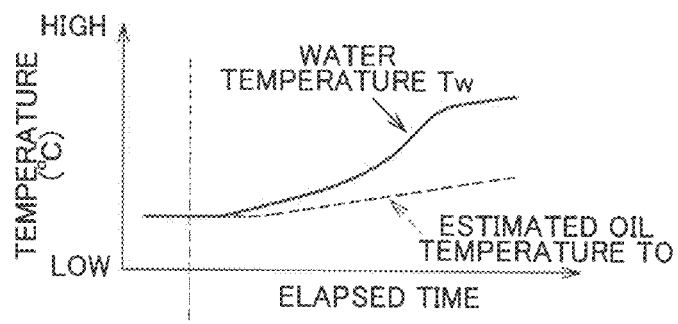
FIG. 11A to FIG. 11D are graphs that diagrammatically show changes in various physical quantities with the elapsed time following the start of the engine.
Figure 11B:
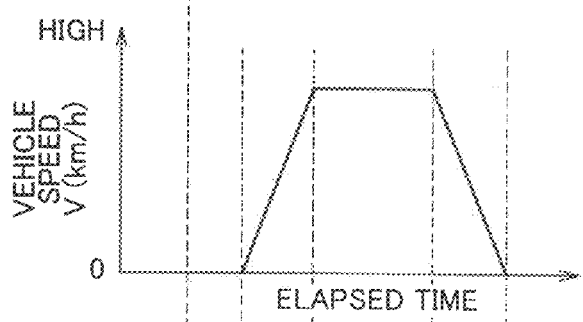
Figure 11C:
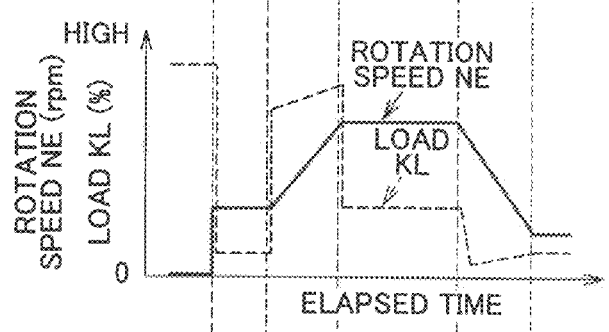
Figure 11D:
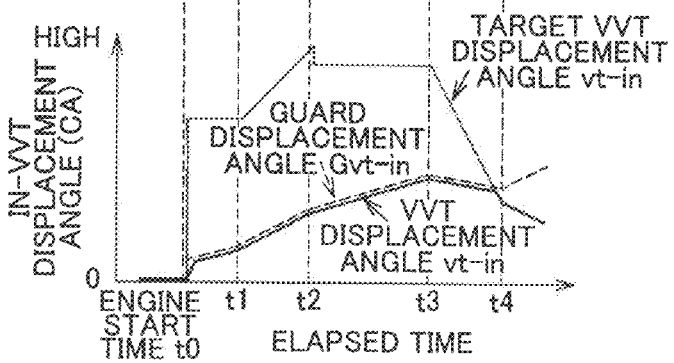

As shown in FIG. 11A, the more time elapses from the start of the engine 200, the greater the difference between the water temperature Tw and the estimated oil temperature TO becomes. As shown in FIG. 11B, the vehicle speed V starts to increase at timing t1 at which a certain time elapses from the time of start t0 of the engine 200, and reaches and remains at a certain speed at timing t2 to t3. After the timing t3, the vehicle speed V decreases, and becomes 0 at timing t4. That is, the engine 200 stops at timing t4. As shown in FIG. 11C, the load KL that acts on the engine 200 increases when the rotation speed Ne of the engine 200 is increased. When the rotation speed Ne is constant, the load KL temporarily decreases, and then remains at a certain value. When the rotation speed Ne decreases, the load KL also decreases. As shown in FIG. 11D, at a timing prior to the timing t4, the magnitude of the target VVT displacement angle vt-in changes from being greater to being smaller than the guard displacement angle Gvt-in. Therefore, the VVT displacement angle vt-in of the intake valves 207 is set at one of the guard displacement angle Gvt-in and the target VVT displacement angle vt-in so that the magnitude of the VVT displacement angle vt-in is as small as possible. In this manner, the fitting of the lock pin 224 into the lock hole 223 is ensured.

Figure 13:
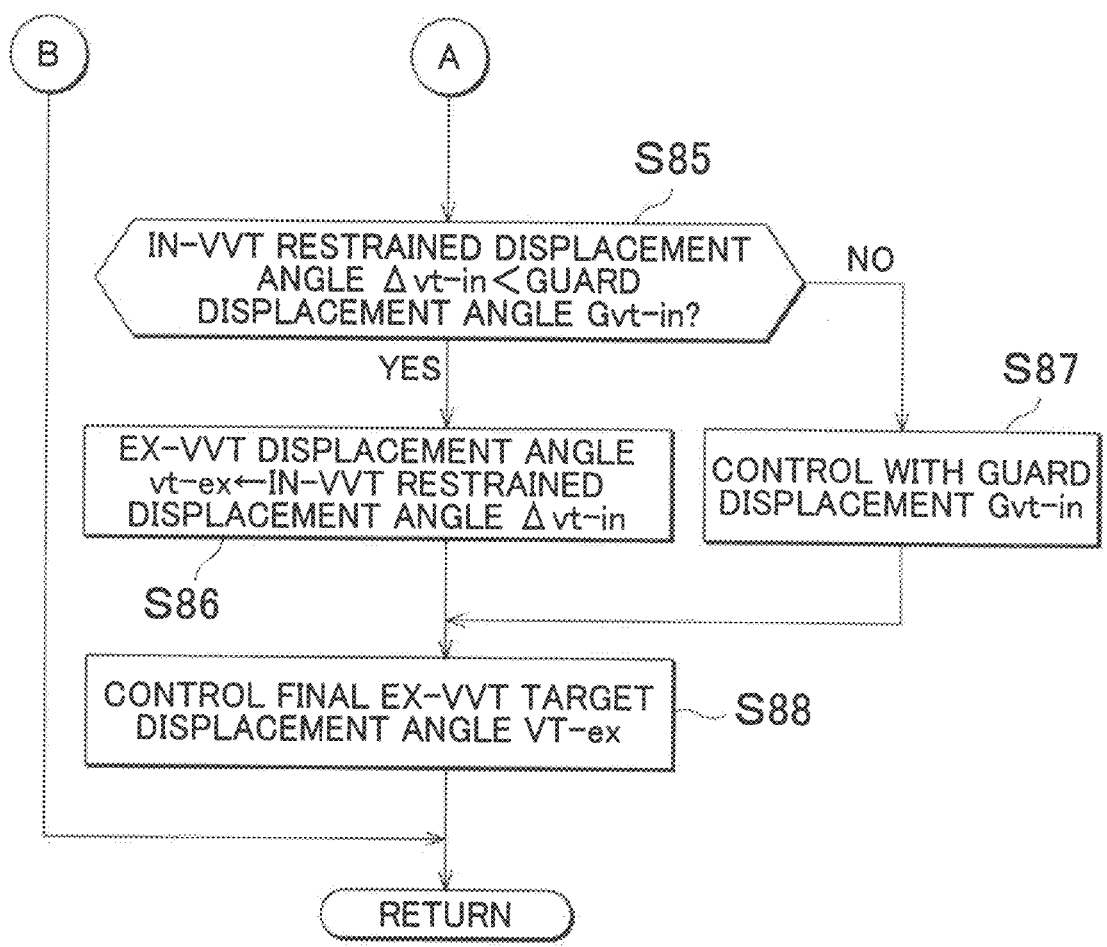
FIG. 13 is the flowchart (part 2) that sequentially shows major processes of the control method in accordance with the modification.
Figure 14A:
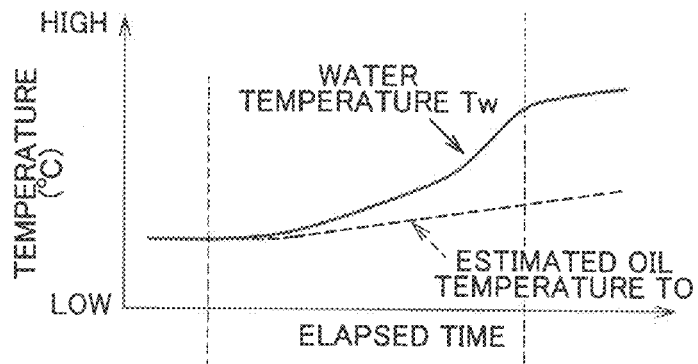
FIG. 14A to FIG. 14C are graphs that diagrammatically show changes in various physical quantities with the elapsed time following the start of the engine.
Figure 14B:
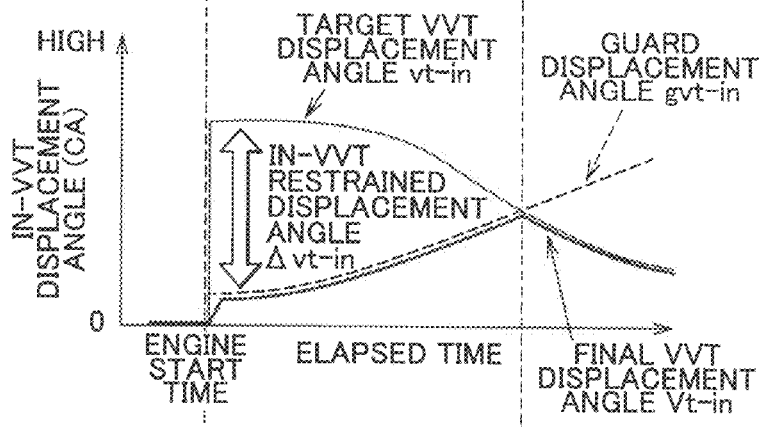
Figure 14C:
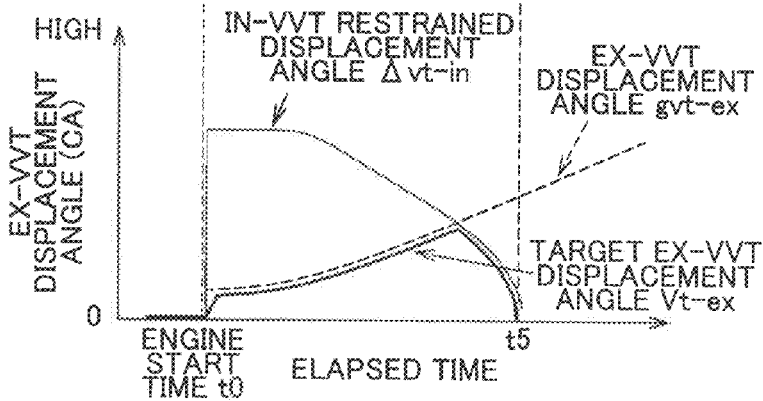

Next, another modification of the control method for the VVT controller 216 which is executed by the ECU 100 included in the engine system 10 in accordance with a second modification of the embodiment with reference to FIGS. 12 to 14C. FIG. 12 and FIG. 13 are a flowchart that sequentially shows major processes of the control method in accordance with this modification. FIG. 14A to FIG. 14C are graphs that diagrammatically shows changes in physical quantities with respect to the elapsed time following the start of the engine 200.

In FIG. 12, the process of step S10 to step S90 is the same as in the foregoing control method. After step S90, the second specific determination process portion 130 specifically determines a guard displacement angle gvt-ex of the exhaust valves 209 such that the knock pin 224 can be fitted into the knock hole 223 on the basis of the oil temperature TO (step S82). Next, the second specific determination process portion 130 specifically determines an IN-VVT restrained displacement angle Avt-in with regard to the intake valves 207 (step S83). The control portion 110 sets a value obtained by subtracting the guard displacement angle gvt-in from the IN-VVT target displacement angle vt-in, as the IN-VVT restrained displacement angle Δvt-in (step S84).

Next, in FIG. 13, the control portion 110 determines whether or not the IN-VVT restrained displacement angle Δvt-in is smaller than the guard displacement angle Gvt-ex (step S85). If it is determined that the IN-VVT restrained displacement angle Δvt-in is smaller than the IN-VVT restrained displacement angle, the control portion 110 uses the IN-VVT restrained displacement angle Avt-in as a VVT displacement angle vt-ex that is set at the time of controlling the VVT controller 216, that is, a displacement angle of the exhaust valves 209, (step S86), and then controls the VVT controller 216 of the exhaust valves 209 through the use of the final EX-VVT target displacement angle VT-ex (step S88). On the other hand, if it is determined that the IN-VVT restrained displacement angle Avt-in is greater than or equal to the guard displacement angle Gvt-ex, the control portion 110 controls the exhaust valves 209 that controls the exhaust valves 209, through the use of the final EX-VVT target displacement angle VT-ex (step S88).

Next, a reason why the guard displacement angle gvt-in of the intake valves 207 is corrected will be explained with reference to FIG. 14A to FIG. 14C.

As shown in FIG. 14A, the more time elapses from the start of the engine 200, the greater the difference between the water temperature Tw and the estimated oil temperature TO becomes. As shown in FIG. 14B, the magnitude of the target VVT displacement angle vt-in changes from being greater to being smaller than the guard displacement angle gvt-in at timing t5 after the start timing t0 at which the engine 20 is started. Therefore, the final VVT displacement angle VT-in is set equal to the smaller one of the target VVT displacement angle vt-in and the guard displacement angle gvt-in. As shown in FIG. 14C, at a timing prior to the timing t5, the final EX-VVT displacement angle VT-ex that is set as the EX-VVT displacement angle that is the displacement angle of the exhaust valves 209 is set equal to the smaller one of the IN-VVT restrained displacement angle and the EX-VVT displacement angle gvt-ex.

By setting the final EX-VVT displacement angle in this manner, an effect of further reducing the HC gas in comparison with the case where the intake valve opening timing is shifted in the advancement direction is attained, in addition to the effects that are attained by the control methods described above.

Next, a map that is referred to in a control method that is executable by the ECU 100 provided in the engine system 10 in accordance with a third modification of the embodiment will be described with reference to FIG. 15. FIG. 15 is a map that shows one of various displacement angles that are given priority as the ones that are to be preferentially changed in various regions that are defined in relations between the oil temperature TO and the catalyst temperature.

In FIG. 15, in a temperature region where the oil temperature TO is lower than or equal to 10° C., the IN-VVT is given priority and the EX-VVT is used for compensation. In the range of the oil temperature TO from −10° C. to +10° C., the EX-VVT is given priority, and the IN-VVT is used for compensation. In the range where the oil temperature TO is higher than or equal to +10° C. and the catalyst temperature is less than or equal to the catalyst activation temperature (e.g., about 350° C.), the EX-VVT is given priority. In the range where the oil temperature TO is higher than or equal to +10° C. and the catalyst temperature is higher than or equal to the catalyst activation temperature, only one of the IN-VVT and the EX-VVT is carried out.

By controlling the action of the VVT controller 216 on the basis of this map, the enlargement of the overlap amount with the EX-VVT is given priority at the time of the start of the engine 200 during which the VVT responsiveness is high. However, in the case where the catalyst temperature is higher than or equal to the catalyst activation temperature, it suffices that the overlap amount is expanded through the use of one of the IN-VVT and the EX-VVT. Besides, in the case where the VVT return responsiveness is restrained by a knock-pin-entrance-characteristic guard, it suffices that the shortage of the overlap amount of the exhaust valves be compensated for by the IN-VVT of the intake valves.

The first specific determination process portion 120, the second specific determination process portion 130 and the control portion 110 in the foregoing embodiment may constitute portions of various processing units, such as an ECU (electronic control unit), or the like, various controllers, or various computer systems, or the like.

The switching between the locked state and the non-locked state in the embodiment, that is, the switching between the fitting and the non-fitting of the lock pin 224 into the lock hole 223, may also be performed by, for example, supply means that includes a circulation apparatus, such as a pump or the like, for supplying the working fluid.

Rotation phase variable control means in the foregoing embodiment may be means that is capable of changing the relative rotation phase of at least one of the intake-side camshaft and the exhaust-side camshaft relative to the rotation phase of the crankshaft (in this specification, also termed "the rotation phase difference"), according to the hydraulic pressure of a working fluid such as an oil or the like, and may also have a construction in which a vaned rotor that is rotatable synchronously with the camshaft is pivoted to the advanced side or the retarded side according to the hydraulic pressure.

Lock means in the foregoing embodiment may be driven by the hydraulic pressure of the working fluid that is also used by the rotation phase variable control means, and may assume a lock state in which the means mechanically fixes (locks) at least a portion of the rotation phase variable control means, for example, a vane of the rotor, or the like, for example, due to friction or the like, or naturally along with decline in the hydraulic pressure, or in accordance with an appropriate control, when the internal combustion engine stops operating. In such a lock state, the lock means may fix the rotation phase difference of the camshaft to a range that is narrower than the movable range of the rotation phase difference, and typically may fix the rotation phase difference to a single value. The lock means may include a lock pin that is switchable between being fitted and not being fitted to a lock hole so that the lock state can be discontinued at the time of start of the internal combustion engine according to the hydraulic pressure of the working fluid.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

What is claimed is:
1. A variable valve apparatus comprising:
   a rotation phase variable control portion that includes a vane and changes relative rotation phase of at least one of an intake-side camshaft and an exhaust-side camshaft that rotate to open and close an intake valve and an exhaust valve, respectively, of an internal combustion engine, relative to rotation phase of a crankshaft, according to hydraulic pressure of a working fluid;

a lock portion that includes a lock pin that is switchable between being fitted and not being fitted to a lock hole formed in the vane so that the lock pin assumes a lock state of fixing the relative rotation phase of at least one of the intake valve and the exhaust valve by mechanically fixing at least a portion of the rotation phase variable control portion when the internal combustion engine stops, and discontinues the lock state when the internal combustion engine starts; and a control device that includes:

a first specific determination portion that sets a first overlap amount that is requested as an overlap amount of overlap between an intake valve opening timing during which the intake valve is open, and an exhaust valve opening timing during which the exhaust valve is open, based on rotation speed of the internal combustion engine, load on the internal combustion engine, and temperature of the working fluid;

a second specific determination portion that sets a second overlap amount that is the overlap amount that is set so that the relative rotation phase is fixed when the internal combustion engine stops, based on the temperature of the working fluid; and a control portion that controls the rotation phase variable control portion so that the overlap amount becomes equal to the second overlap amount, if the first overlap amount is larger than the second overlap amount, and that controls the rotation phase variable control portion so that the overlap amount becomes equal to the first overlap amount, if the first overlap amount is less than or equal to the second overlap amount.

2. The variable valve apparatus according to claim 1, wherein the first overlap amount is smaller if the temperature of the working fluid is higher.

3. The variable valve apparatus according to claim 1, wherein the second overlap amount is larger if the temperature of the working fluid is higher.

4. The variable valve apparatus according to claim 1, further comprising a correction portion that corrects the second overlap amount so that the second overlap amount is smaller if speed of a vehicle that is supplied with power from the internal combustion engine is lower.

5. The variable valve apparatus according to claim 1, wherein:

the rotation phase variable control portion is connected to the intake-side camshaft so as to change the relative rotation phase of at least the intake-side camshaft relative to the rotation phase of the crankshaft, according to the hydraulic pressure of the working fluid; and the control portion controls the rotation phase variable control portion so that the intake valve opening timing is changed.

6. The variable valve apparatus according to claim 5, wherein if the first overlap amount is larger than the second overlap amount, the control portion controls the rotation phase variable control portion so that the overlap amount is made equal to the second overlap amount by advancing the intake valve opening timing.

7. The variable valve apparatus according to claim 1, wherein:

the rotation phase variable control portion is connected to the exhaust-side camshaft so as to change at least the relative rotation phase of the exhaust-side camshaft relative to the rotation phase of the crankshaft, according to the hydraulic pressure of the working fluid; and the control portion controls the rotation phase variable control portion so as to change the exhaust valve opening timing.

8. The variable valve apparatus according to claim 7, wherein if the first overlap amount is less than or equal to the second overlap amount, the control portion controls the rotation phase variable control portion so that the overlap amount is made equal to the first overlap amount by retarding the exhaust valve opening timing.

9. The variable valve apparatus according to claim 1, wherein if the first overlap amount is larger than the second overlap amount, the temperature of the working fluid is lower than or equal to −10° C., and if the first overlap amount is less than or equal to the second overlap amount, the temperature is above −10° C.

10. The variable valve apparatus according to claim 1, wherein at least a portion of the rotation phase variable control portion is mechanically fixed by the lock pin fitting to the lock hole.

11. The variable valve apparatus according to claim 10, wherein the lock state is a state in which the relative rotation phase of the intake-side camshaft is a phase in which the vane is positioned furthest to a retarded side in a movable range of the vane.

12. The variable valve apparatus according to claim 1, wherein the rotation phase variable control portion changes the relative rotation phase via the working fluid.

13. The variable valve apparatus according to claim 1, wherein the first overlap amount is an overlap amount that is requested in order to heighten combustion efficiency of the internal combustion engine.

\* \* \* \* \*